Patented Feb. 24, 1953

2,629,749

UNITED STATES PATENT OFFICE 2,629,749

PRODUCTION OF HALOBICYCLOALKYL AROMATIC COMPOUNDS

Louis Schmerling, Riverside, Ill., assignor to Universal Oil Products Company, Chicago, Ill., a corporation of Delaware No Drawing. Application May 25, 1949, Serial No. 95,364

15 Claims. (Cl. 260—649)

This application is a continuation-in-part of my co-pending application Serial Number 738,206, filed March 29, 1947, now abandoned.

This invention relates to a process for manufacturing halobicycloalkyl aromatic compounds and particularly halobicycloalkyl aromatic hydrocarbons.

An object of this invention is to produce halobicycloalkyl aromatic compounds.

Another object of this invention is to produce halobicycloalkyl aromatic hydrocarbons.

A further object of this invention is to produce a chlorobicycloalkyl aromatic hydrocarbon.

A still further object of this invention is to produce a chlorobicycloalkyl benzene hydrocarbon.

One specific embodiment of this invention relates to a process for producing a halobicycloalkyl aromatic compound which comprises reacting an aromatic compound having a replaceable nuclear hydrogen atom and a halobicycloalkene in the presence of an alkylating catalyst at an alkylating temperature.

An additional embodiment of this invention relates to a process for producing a halobicycloalkyl aromatic compound which comprises reacting an aromatic compound having a replaceable nuclear hydrogen atom and a halobicycloalkene in which the halogen has an atomic weight of from about 35 to about 80 in the presence of an alkylating catalyst at an alkylating temperature.

Another embodiment of this invention relates to a process for producing a halobicycloalkyl aromatic compound which comprises reacting an aromatic compound having a replaceable nuclear hydrogen atom and a halobicycloalkene in which the halogen has an atomic weight of from about 35 to about 80 in the presence of an acid-acting alkylating catalyst at an alkylating temperature.

A further embodiment of this invention relates to a process for producing a chlorobicycloalkyl aromatic compound which comprises reacting an aromatic compound and a chlorobicycloalkene in the presence of an acid-acting alkylating catalyst at an alkylating temperature.

Another embodiment of this invention relates to a process for producing a bromobicycloalkyl aromatic compound which comprises reacting an aromatic compound having a replaceable nuclear hydrogen atom and a bromobicycloalkene in the presence of an acid-acting catalyst at an alkylating temperature.

A further embodiment of this invention relates to a process for producing a chlorobicycloalkyl aromatic hydrocarbon which comprises reacting an aromatic hydrocarbon and a chlorobicycloalkene in the presence of an acid-acting alkylating catalyst at an alkylating temperature.

Aromatic compounds useful as starting materials in this process have at least one replaceable nuclear hydrogen atom and also may have a carbon atom of said ring, combined with a member of the group consisting of a halogen atom, a hydroxyl group, an amino group, an alkoxyl group, an alkyl group, a cycloalkyl group, and an aryl group. Of these different aromatic compounds, the aromatic hydrocarbons which are preferred starting materials include particularly benzene, monoalkylbenzenes, other alkylbenzenes having at least one replaceable nuclear hydrogen atom and also polynuclear aromatic hydrocarbons containing one or more replaceable nuclear hydrogen atoms. Aromatic compounds other than hydrocarbons which are convertible by this process into halobicycloalkyl aromatic compounds include particularly halobenzenes, phenols, naphthols, anilines, alkyl aryl ethers and the like.

Halobicycloalkenes which are reacted with aromatic compounds as herein set forth include particularly chloro and bromobicycloalkenes. Some of these halobicycloalkenes have two 5-carbon atom rings and include halobicyclo [2.2.1] heptenes and related compounds which may be formed by the reaction of a halogen, such as chlorine or bromine which have atomic weights of from about 35 to about 80, with a bicycloolefin such as may be formed by the thermal condensation of cyclopentadiene and ethylene or of cyclopentadiene and another monoolefin or of dicyclopentadiene and an olefin. Similar halobicycloolefins are also produced by the condensation of dicyclopentadiene or cyclopentadiene with allyl chloride, vinyl chloride, or another haloolefin, by what is generally regarded as a Diels-Alder reaction. Other halobicycloolefins which may be utilized in this process are formed by the addition of a halogen to a terpenic hydrocarbon such as camphene, bornylene, cyclofenchene, 2,6-dimethylbicyclo [3.2.1]-2-octene (which contains a ring of six carbon atoms and a second ring of five carbon atoms).

Acid-acting catalysts which are suitable for use in the process of this invention include sulfuric acid, hydrogen fluoride, phosphoric acid, activated clays, synthetically prepared composites of silica and at least one member of the group consisting of alumina, magnesia, thoria, titania, and zirconia. Metal halides of the Friedel-Crafts type and boron fluoride may also be used but are usually less preferable because of the relative ease with which side reactions involving the elimination of hydrogen halide may occur.

This process may be carried out using either batch or continuous types of operation. In batch-type treatment an aromatic compound and a halobicycloolefin are reacted in the presence of one or more of the above indicated acid-acting catalysts in a closed reactor provided with adequate means of agitation and maintained at a temperature at which the aromatic compound is alkylated by or is condensed with the halobicycloolefin. The resultant reaction mixture is then subjected to suitable separating treatment to recover the unreacted hydrocarbons which are suitable for further treatment in the process and to isolate the desired halobicycloalkyl aromatic compound formed in the process.

Continuous operation may be carried out by charging the aromatic compound and halobicycloolefin to a reactor containing an acid-acting catalyst distributed upon or composited with a supporting material and provided with suitable heating or cooling means for controlling the reaction temperature. When operating with an acid-acting catalyst which is liquid or gaseous at the reaction conditions, the catalyst may be charged continuously to the reactor to which the reacting organic compounds are charged.

From the exit end of the reactor or series of reactors, in case more than one reactor is used, the total reaction mixture is directed to suitable separating and/or fractional distilling means by which the halobicycloalkyl aromatic compound or halobicycloalkyl aromatic compounds formed in the process may be separated from the unconverted starting materials and catalysts, these unconverted materials and catalysts being suitable for recycling to the process.

The operating conditions used in the batch type and continuous type of operation generally depend upon the chemical activity of the reactants and the catalytic activity of the acid-acting catalyst. In general, a temperature of from about $-10°$ to about $50°$ C. is used with a catalyst such as sulfuric acid, while a higher temperature of from about $75°$ to about $300°$ C. is used in the presence of a phosphoric acid catalyst, such as a normally liquid phosphoric acid, a phosphoric acid supported by a carrier, or a solid precalcined composite of a siliceous carrier and a phosphoric acid such as a calcined mixture of diatomaceous earth and orthophosphoric acid or a polyphosphoric acid including pyrophosphoric acid, triphosphoric acid, and tetraphosphoric acid.

When aluminum bromide or aluminum chloride is utilized as a condensation catalyst in this process, the operating temperature is generally below about $40°$ C. while somewhat higher temperatures are needed in the presence of ferric chloride which is a Friedel-Crafts catalyst of lower activity than aluminum chloride.

A halobicycloalkyl aromatic compound and particularly a halobicycloalkyl benzene hydrocarbon formed as herein set forth may be used as an intermediate in the production of insecticides, the halobicycloalkyl aromatic compound may be converted into plastics by condensation in the presence of aluminum chloride, hydrogen fluoride, or other condensation catalysts; or it may be used as an intermediate in the production of other polycyclic compounds containing an aromatic ring. The halobicycloaromatic compounds and particularly halobicycloalkyl aromatic hydrocarbons may be dehydrohalogenated by pyrolysis or by treatment with water or with a metal oxide at an elevated temperature or by other suitable means, to form bicycloalkenyl aromatic hydrocarbons. These bicycloalkenyl aromatic hydrocarbons are useful as raw materials in the production of high molecular weight resins, plastics, or polymeric materials and also in the production of insecticides, drugs, and the like. For example, chlorobicycloheptylbenzene may be dehydrochlorinated to form a bicycloheptenylbenzene, convertible into polymeric materials.

The following example is given to illustrate the process of this invention although the data are introduced with no intention of limiting unduly the generally broad scope of the invention.

Bicyclo[2.2.1]-2-heptene which was formed readily by heating a mixture of dicyclopentadiene and ethylene under pressure at $200°$ C. reacted readily with chlorine at temperatures of $-70°$, $0°$, and $35°$ C. to give from 29 to 50% yields of the unsaturated chloride, 2-chlorobicyclo[2.2.1]-2-heptene as an unexpected product and from 25% to 35% of the expected dichloride, 2,3-dichlorobicyclo [2.2.1] heptane.

125 grams of benzene and 25 grams of 2-chlorobicyclo[2.2.1]-2-heptene were stirred with 30 grams of sulfuric acid of 96% concentration at a temperature of $1°$ C. for one hour. The resultant reaction mixture was separated into 148 grams of an upper layer and 34 grams of a used sulfuric acid catalyst layer. The upper layer was washed with water and caustic soda solution and then fractionally distilled first at atmospheric pressure to remove benzene and then at a pressure of 3 mm. of mercury to distill the condensation product. The major part of the condensation product boiled at $133°$ C. at a pressure of 3 mm. of mercury (calculated boiling point of $298°$ C. at 760 mm. pressure) and had a refractive index $n_D^{20}$, of 1.5605, density, $d_4^{20}$, 1.1305. Analysis of this material showed the composition as 75.46% carbon, 7.25% hydrogen, and 17.36% chlorine, these results corresponding closely to the analysis calculated for the compound, $C_{13}H_{15}Cl$ which contains 75.51% carbon, 7.32% hydrogen, and 17.17% chlorine. This condensation product was a chlorobicycloheptyl benzene with the following structural formula:

The yield of this material (2-phenyl-x-chlorobicyclo[2.2.1] heptane) was 67% of the theoretical. 2 - Phenyl-3 - chlorobicyclo [2.2.1] heptane was a major constituent of this product.

4 cc. of the above indicated chlorobicycloheptyl benzene was heated at $210°$ C. for 4 hours with 100 cc. of water. Steam distillation of the resultant reaction mixture yielded 1 cc. of bicycloheptenylbenzene boiling at $260°$ C. and having a refractive index, $n_D^{20}$, of 1.5643.

I claim as my invention:

1. A process for producing a halobicycloalkyl aromatic compound which comprises reacting an aromatic compound having a replaceable nuclear hydrogen atom, in the presence of an alkylating catalyst at an alkylating temperature, with the monohalide resulting from the halogenation of a bicyclo [2.2.1] heptene, the halogen of said monohalide being selected from the group consisting of chlorine and bromine.

2. A process for producing a halobicycloalkyl aromatic compound which comprises reacting a benzene hydrocarbon having a replaceable nuclear hydrogen atom, in the presence of an acid-acting alkylating catalyst at an alkylating temperature, with the monochloride resulting from the chlorination of a bicyclo [2.2.1] heptene.

3. A process for producing a chlorobicycloalkyl aromatic compound which comprises reacting an aromatic compound having a replaceable nuclear hydrogen atom, in the presence of an acid-acting alkylating catalyst at an alkylating temperature, with the monochloride resulting from the chlorination of a bicyclo [2.2.1] heptene.

4. A process for producing a halobicycloalkyl aromatic hydrocarbon which comprises reacting an aromatic hydrocarbon having a replaceable nuclear hydrogen atom, in the presence of an acid-acting alkylating catalyst at an alkylating temperature, with the monohalide resulting from the halogenation of a bicyclo [2.2.1] heptene, the halogen of said monohalide being selected from the group consisting of chlorine and bromine.

5. A process for producing a chlorobicycloalkyl aromatic hydrocarbon which comprises reacting an aromatic hydrocarbon having a replaceable nuclear hydrogen atom, in the presence of an acid-acting alkylating catalyst at an alkylating temperature, with the monochloride resulting from the chlorination of a bicyclo [2.2.1] heptene.

6. A process for producing a halobicycloalkyl aromatic hydrocarbon which comprises reacting an aromatic hydrocarbon having a replaceable nuclear hydrogen atom, in the presence of a sulfuric acid catalyst at an alkylating temperature, with the monochloride resulting from the chlorination of a bicyclo [2.2.1] heptene.

7. A process for producing a halobicycloalkyl aromatic hydrocarbon which comprises reacting an aromatic hydrocarbon having a replaceable nuclear hydrogen atom, in the presence of a phosphoric acid catalyst at an alkylating temperature, with the monochloride resulting from the chlorination of a bicyclo [2.2.1] heptene.

8. A process for producing a halobicycloalkyl aromatic hydrocarbon which comprises reacting an aromatic hydrocarbon having a replaceable nuclear hydrogen atom, in the presence of a hydrogen fluoride catalyst at an alkylating temperature, with the monochloride resulting from the chlorination of a bicyclo [2.2.1] heptene.

9. The process of claim 4 further characterized in that said aromatic hydrocarbon is mononuclear.

10. A process for producing a 2-aryl-x-chlorobicyclo [2.2.1] heptane which comprises reacting an aromatic hydrocarbon having a replaceable nuclear hydrogen atom, in the presence of sulfuric acid at a temperature of from about $-10°$ to about $50°$ C., with the monochloride resulting from the chlorination of a bicyclo [2.2.1] heptene.

11. A process for producing a 2-phenyl-x-chlorobicyclo [2.2.1] heptane which comprises reacting benzene and chlorobicyclo [2.2.1]-2-heptene in the presence of sulfuric acid at a temperature of from about $-10°$ to about $50°$ C.

12. A process for producing 2-phenyl-x-bromobicyclo [2.2.1] heptane which comprises reacting benzene and bromobicyclo [2.2.1]-2-heptene in the presence of sulfuric acid at a temperature of from about $-10°$ to about $50°$ C.

13. 2-Phenyl-3-chlorobicyclo [2.2.1] heptane.

14. 2-Phenyl-3-bromobicyclo [2.2.1] heptane.

15. A 2-phenyl-3-halobicyclo [2.2.1] heptane in which the halogen is selected from the group consisting of chlorine and bromine.

LOUIS SCHMERLING.

REFERENCES CITED

The following references are of record in the file of this patent:

UNITED STATES PATENTS

| Number | Name | Date |
| --- | --- | --- |
| 1,969,984 | Martin et al. | Aug. 14, 1934 |